June 19, 1962  G. F. MEYER  3,039,787
ADJUSTABLE KITS FOR BALL-JOINTS OF VEHICLE SUSPENSION SYSTEMS
Filed Sept. 16, 1959  3 Sheets-Sheet 3
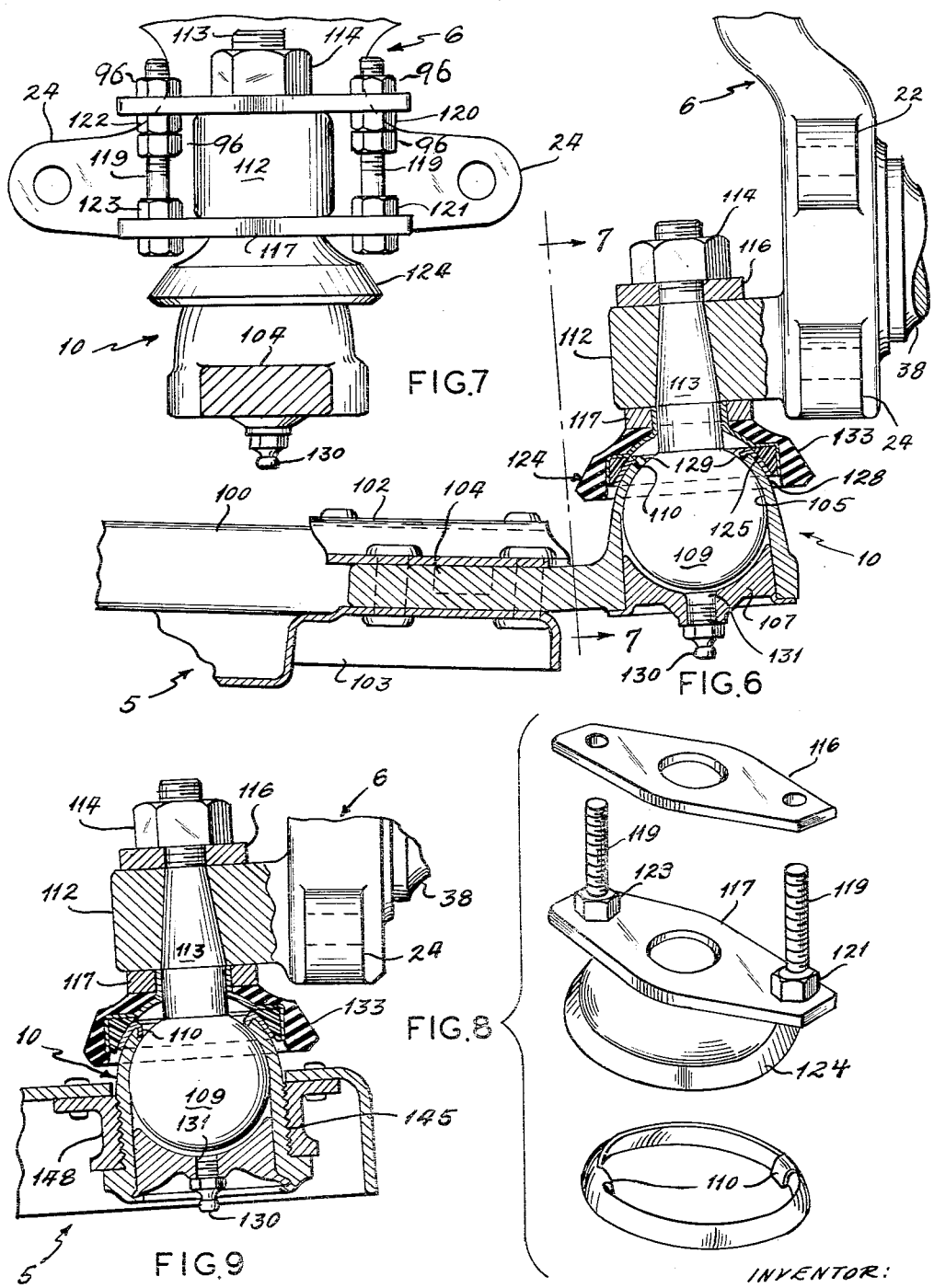
INVENTOR:
GLEN F. MEYER
By Sutherland, Polster + Taylor
ATTORNEYS.

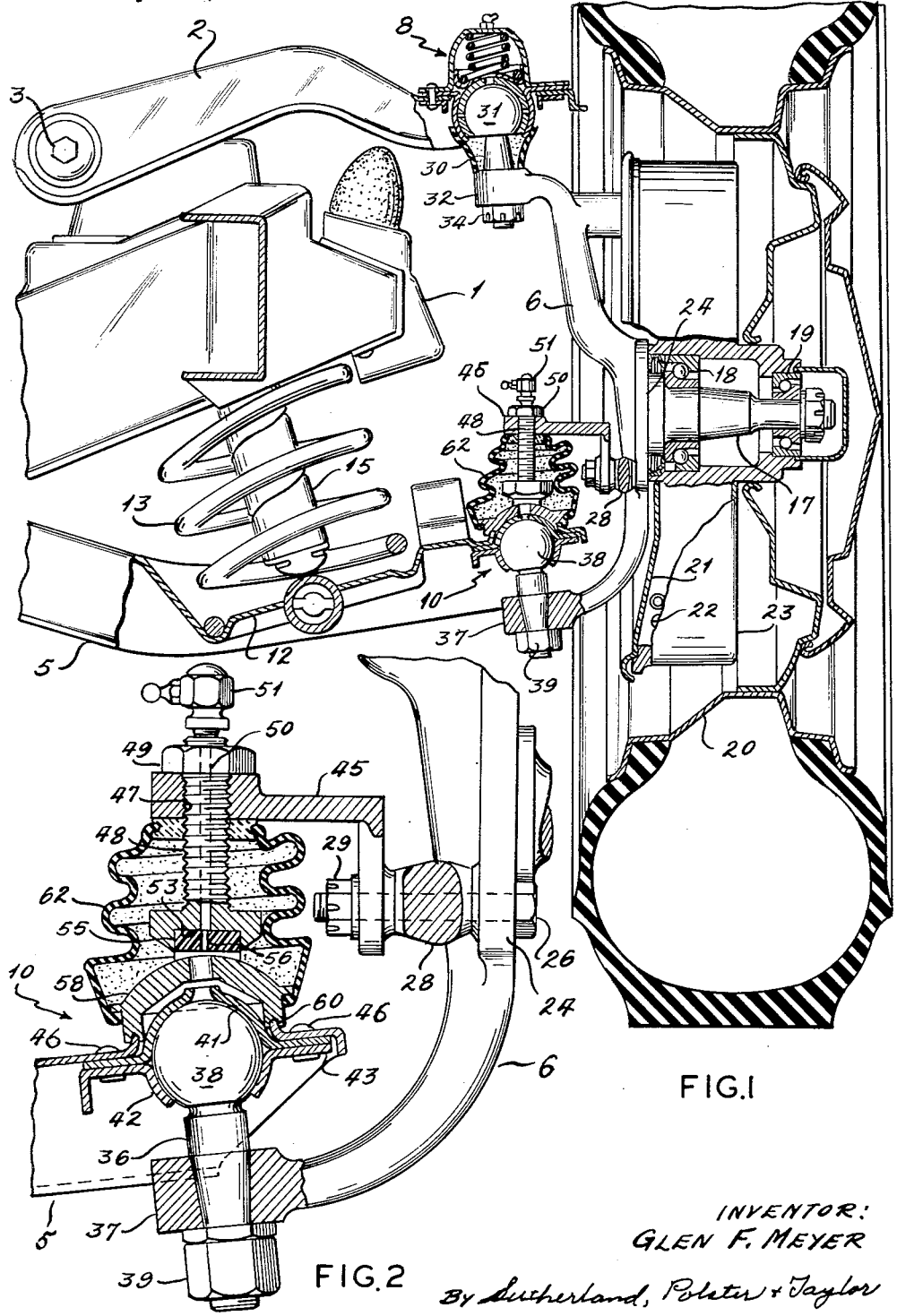

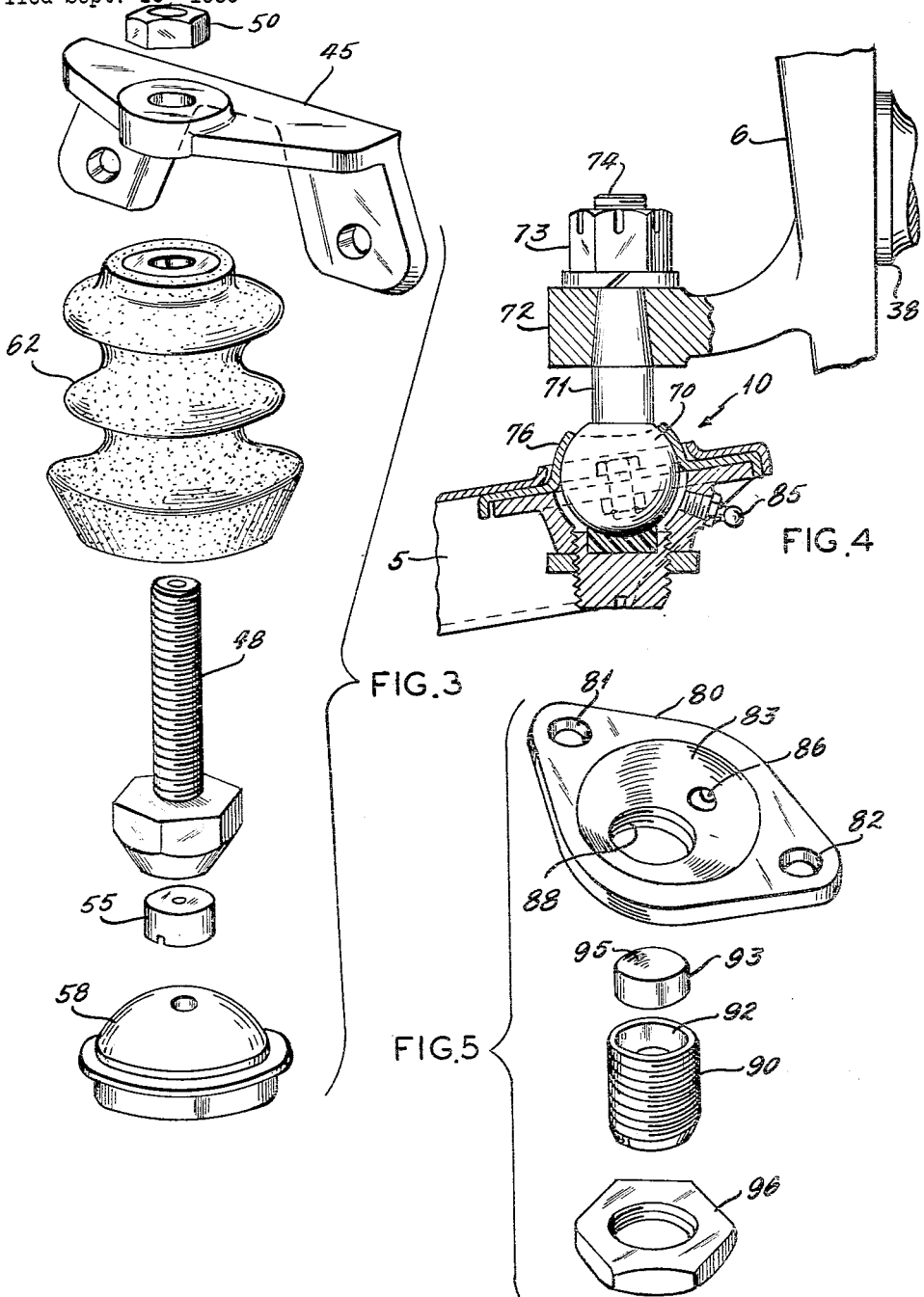

United States Patent Office 3,039,787
Patented June 19, 1962

3,039,787
ADJUSTABLE KITS FOR BALL-JOINTS OF VEHICLE SUSPENSION SYSTEMS
Glen F. Meyer, Veldavillage Hills, Mo., assignor to Champ-Items, Inc., St. Louis, Mo., a corporation of Missouri
Filed Sept. 16, 1959, Ser. No. 840,413
11 Claims. (Cl. 280—96.2)

This invention relates to ball-joint wheel suspensions for vehicles and more particularly to ball-joint suspensions for the dirigible wheels on a vehicle. A specific example is the independent front-wheel suspension system of current models of motor cars which are all very similar, and the invention, here described, and illustrated, is applied to suspension systems arbitrarily chosen as typical although, of course, the invention is not so limited.

By way of explanation, it is usual automotive practice to suspend each front wheel for vertical movement by a parallel linkage hinged on the main frame of the vehicle chassis. Each link may be described as an A-frame and each A-frame is hinged on vertically spaced pairs of bearings located in alignment and so arranged as to support a pair of shafts, the bearings on the wide portion of each A-frame are in turn journaled in these shafts in abutting relation with the bearings on the chassis so as to prevent axial movement along the shaft. Practically without exception, the lower A-frame supports the vertical load. If the springing is by coil spring or air spring, the lower A-frame has a spring seat on its upper side and the spring has its lower end in this seat and its upper end in a seat on the vehicle chassis. On the other hand, if the springing is by torsion-bar, the lower A-frame is non-rotatably connected to the torsion bar so that its upward swinging motion twists one end of a torsion bar which has its other end fixed to the chassis against rotation. These suspensions all have a steering knuckle carried between the outer ends of the A-frame in a substantial vertical manner. Each steering knuckle carries a spindle for the front wheel and a spindle flange surrounding the spindle to which the backing plate is bolted. The brake actuating elements and brake shoes are on the outer face of the backing plate. The outer end of each A-frame is connected with the top and bottom ends of the steering knuckle by ball joints so that the sub-assembly of A-frame, spindle, and wheel can move up and down to hinge about each ball joint. This action is cushioned in turn by the spring acting on the lower A-frame. Each ball joint also mounts the wheel for steering by rotation of the steering knuckle about an axis through the center of the balls of each ball joint.

Each wheel suspension is similar and well known in the art, and each suspension has other elements such as shock absorbers, and roll bars, all connected to the lower A-frame. This invention is not primarily concerned with these elements above mentioned, but an understanding that they are present will clarify this explanation of the invention.

Usually the lower A-frame is the load-carrying member while the upper A-frame is the guiding member in the suspension system. And this is important to a full understanding of this invention. It is likewise important to understand that the steering mechanism is connected with each steering knuckle for each front wheel and that unless the ball joints in the suspension, especially the lower one on the load-carrying member functions perfectly, wheel alignment and steering will be adversely affected. As stated, obviously the ball joint between the lower end of the steering knuckle and the lower A-frame is subject to the major stresses for the reasons above set forth, and it is at a critical point in the suspension system, subject to the greatest loads during steering. Any misalignment or play in this ball joint due to wear upsets the function of the steering linkage and can produce "tramp" and "wander" in certain ranges of vehicle speed although the wheel alignment is correct under static conditions.

This invention is concerned with kits which can be applied to any ball joint in any suspension system which is subject to operation under similar stress, and specifically to kits which can be applied to ball joints in various makes of motor cars subject to similar stress conditions and usually in a corresponding location as above described. To avoid the use of trade names to identify the cars, three kits and their parts are contemplated which together will be generally adaptable to a multiplicity of motor cars of different makes. All of the kits may be said to have certain elements in common. Each kit has a bracket member mounted to the movable suspension, a bearing member operating in a direction to increase the load of the ball element of the ball joint on its socket, and an adjustment between the bracket and the bearing member to determine the degree of play of the ball in its socket. Each of these kits are so constructed that when installed in the suspension system for the particular motor car to which it is adapted, it will eliminate any shifting of the axis of the steering knuckle with respect to the lower A-frame. Steering adjustment is thereby properly maintained under both dynamic and static conditions.

It is an object of this invention to provide a kit for ball joints of vehicle suspension systems which will eliminate the effect of wear or misalignment of the parts.

It is an object of this invention to provide a kit for ball joints of vehicle suspension systems which will eliminate misalignment in the steering mechanism under dynamic conditions.

It is an object of this invention to provide a kit for ball joints in vehicle suspension systems which will eliminate the need for frequent replacement.

The specific arrangements of these elements mentioned above, the bracket member, the bearing member, and the adjustment means, will appear from the detailed description, and illustrations corresponding therewith, appearing in the accompanying drawings in which:

FIGURE 1 is an environmental view illustrating the invention applied to one specific example of independent front wheel suspension used on a current domestic model of motor car;

FIGURE 2 is a detail view on an enlarged scale illustrating a portion of the suspension system illustrated in FIGURE 1 on an enlarged scale;

FIGURE 3 is an enlarged view of the elements of the kit of this invention as illustrated applied to the suspension system in FIGURES 1 and 2;

FIGURE 4 is a fragmentary illustration of a like portion of another example of independent front wheel suspension used on a current model of motor car illustrating the suitable kit parts applied.

FIGURE 5 is an illustration of the novel kit of this invention shown as applied in FIGURE 4;

FIGURE 6 is a fragmentary view partly in section of another specific example of independent front wheel suspension system used on a current model of motor car;

FIGURE 7 is a side view partly in section on line 7—7 of FIGURE 6 looking in the direction of the arrows;

FIGURE 8 illustrates the elements of the novel kit of this invention shown applied to the suspension system in FIGURE 6; and, FIGURE 9 is another fragmentary view illustrating another modification of suspension system to which the kit shown in FIGURE 7 can be applied.

Detailed Description of the Invention

This detailed description will be limited to the ball joint connection between the link members of the suspension system briefly described heretofore and corresponding elements in the several views will be indicated by like reference characters.

FIGURE 1 illustrates a dirigible front wheel suspension for a motor vehicle of one type now in general usage. Since all suspension systems are similar or alike in principle, the description of one will serve for all. In this particular suspension system, the automobile chassis is indicated as one and the illustration here shows only the left front corner of the chassis and the left front wheel suspension. It will be understood that both front suspensions are substantially identical. On the chassis 1 is a parallel linkage having an upper hinged link 2 journaled on the chassis at the point 3. The lower link of the parallel linkage is indicated as 5 and this link is also hinged on suitable bearings to the chassis 1 (not shown). Between the parallel links 2 and 5 is a steering knuckle 6. Ball joints generally indicated 8 and 10 interconnect the steering knuckle 6, with the free ends of the links 2 and 5 of the parallel linkage.

Link 5 is a generally A-shaped frame member in plan view as is also link 2 and located between the sides of the A-frame 5 is a spring seat 12. Spring 13 is compressed between the link 5 and the chassis and, as is usual, surrounds a shock absorber 15 which is connected at one end with the chassis and at the other end with the link 5.

The steering knuckle 6 carries an integral wheel spindle 17 upon which are the bearings 18 and 19 for the wheel 20. An apertured backing plate 21 carries the brake elements such as 22 within the brake drum 23. This backing plate 21 is in turn fixed to a flange such as 24 carried by the steering knuckle 6 by a plurality of bolts such as 26 one of which is illustrated. These bolts pass through the backing plate and through a steering arm 28 secured to the steering knuckle 6.

From the description so far, it will be readily understood that the front wheel is articulated to the chassis 1 so as to ride up and down with respect to the chassis on the parallel linkage which includes the links 2 and 5 and the steering knuckle 6. The articulation for this movement is provided by the pivots on the chassis for the links 2 and 5 and by the ball joints at the ends of the parallel links 2 and 5 which connect these links with the steering knuckle 6. As shown, the wheel 20 is dirigible by pivoting movement around an axis through the ball joints 8 and 10 respectively and may be so controlled by means of a steering linkage well known in the art connected with the steering arm 28.

The upper link 2 is primarily a guiding link, whereas the link 5 and the ball joint 10 and the steering knuckle 6 all form a part of the primary load-carrying linkage. The steering knuckle 6 has an apertured upper end 32 secured to stem 30, integral with the ball 31 by a nut 34.

At the lower end of the steering knuckle 6 is a horizontally extending apertured bracket 37 which in turn is secured by a nut 39 to the stem 36 of the ball 38 in the ball joint 10. The ball 38 in turn is seated in a socket 41 and maintained therein by the spherical flange 42 on a bracket 43. Suitable studs or rivets 46 secure the bracket 42 and the ball socket 41 to the A-frame 5.

Since the ball 38 is originally attached to the steering knuckle 6 it will in turn move with the steering knuckle. On the other hand, the socket 41 is fixed to the outer end of the A-frame link 5 and, of course, forms a part thereof. The entire load of this portion of the vehicle will be transmitted to link 5 through spring 13 and shock absorber 15. This load in turn is transmitted to the steering knuckle 6 through the socket 41 to ball 38 of the ball joint 10 and from the steering knuckle 6 to the wheel 20. It will further be apparent that the upper A-frame for forming link 2 is merely a guiding link and supports none of the weight of the vehicle. Its primary purpose being to resist braking torsion and to maintain wheel alignment since the wheel 20 and steering knuckle 6 pivot about an axis through the center of the ball 31 and 38. The spring in the ball joint 8 will prevent any substantial shifting of the upper end of the steering axis through the two ball joints. This is not so as to the lower ball joint 10, which carries the load and is subject therefore, to most of the wear. It has been the experience of those concerned with the maintenance and wheel alignment in the service field, that wear in the lower ball joint 10 will occur with the result that wheel alignment cannot be maintained. To correct this defect, it is necessary to replace the entire ball joint 10 which is not a simple matter and involves a large labor charge. To avoid this, the present invention is a construction including several kit items which can be applied to the lower ball joint 10 so as to avoid any shifting of the axis through the two ball joints due to wear in the lower ball joint 10.

The operating principle of this kit when applied is such as to maintain the ball 38 tightly seated in the socket 41 at all times, thus preventing the ball 38 from moving back and forth between the socket 41 and the flange 42. The kit elements are arranged to apply a force acting between two of the links 5 and 6 of the primary load carrying linkage in a direction to force the ball 38 against its socket 41 and maintain it in that position.

The elements of the kit are shown assembled in FIGURE 2 and are applied by removing nuts 29 which attach the steering arm 28 and the backing plate 21 (see FIGURE 1) to the steering knuckle 6 through flange 24. It may be necessary to use longer bolts 26 for this purpose, but that is the only change in the standard equipment of the vehicle, in a replacement sense. The kit includes a bracket 45 through which the bolts 26 project and nuts 29 on the bolts 26 which secure the bracket 45 rigidly to the steering knuckle 6 through the flange 24. Bracket 45 has a threaded aperture 47 which receives an adjustable means in the form of a threaded stud 48. The upper end of the stud has a jam nut 49 and an internally threaded passage 50 to which a threaded grease fitting 51 is connected. In the opposite end of the stud 48 is a socket 53 forming a cup-shaped holder for a cup-shaped plug of plastic bearing material 55. The plug is centrally apertured at 56 so that passage 50 can communicate with grooves in the bearing for lubrication purposes. The plug is preferably made of nylon.

The lower surface of the plug 55 has a concave face forming a socket of the type used in universal joints which in turn, engages the convex face of a cup-like bearing element 58 seated on the A-frame 5 and maintained in alignment by engagement with a flange 60 on the A-frame 5. This cup-shaped bearing is also apertured so as to allow the passage of grease from the fitting 51 into the ball joint 10. A suitable dust boot 62 of rubber encloses the cup-shaped bearings 55 and 58 so as to prevent the entrance of dirt between the bearing surfaces.

Operation

Cup-shape bearings 55 and 58 can be adjusted one with respect to the other by the adjustable means 48 which when threaded downwardly will produce a force between these bearing surfaces transmitted directly from the steering knuckle 6 to the link 5 in a direction in which thrust is applied between the elements of the ball joint by vehicle load on the suspension system. This prevents any movement of the ball 38 from its socket 41. Thus, after the wheels have been properly aligned, under static conditions, these conditions will prevail under all operating conditions so that the wheels stay in alignment and there is no shifting of the steering axis through the center of the balls 31 and 38.

Detailed Description of Modified Form

A modified form of the invention is illustrated in FIGURES 4 and 5, and in the description of these figures the same reference characters will be used to indicate corresponding parts in FIGURES 4 and 5 to those heretofore described. FIGURE 5 illustrates the kit elements dis-assembled in an exploded view, while FIGURE 4 illustrates how the kit elements are applied.

The fragmentary view in FIGURE 4 illustrates the lower link 5 of the A-frame for another form of suspension system. The outer end of the A-frame carries a ball joint indicated as 10 which in turn has a ball 70 with an integral stem 71 to which a bracket 72 is attached by means of a nut 73 on threaded portions 74 of the stem 71. The bracket 72 is integral with the steering knuckle 6. The elements 5, 6, and 10 correspond with the similarly indicated numbers in the above detailed description. The primary difference between the modified form of suspension system in FIGURE 4 and the suspension system in FIGURE 1 is in the location and arrangement of the ball joint 10. In FIGURE 4 the load is carried by the stem side of the ball 70, whereas in FIGURES 1 and 2 it is carried by the ball side opposite the stem. This is the significant difference and, consequently, the remaining structure of the suspension system has been omitted for clarity. The full weight of the vehicle rests upon the link 5 through a spring as shown in FIGURE 1 and this weight is transmitted to the wheel 20, not shown here, through the ball 70, socket 76, stem 71, bracket 72, steering knuckle 6, and spindle 38, all in the manner heretofore described.

Ball 70 is maintained seated, therefore, in the socket 76 by the weight of the vehicle, and under static conditions the front wheels can be properly aligned; but after some wear takes place in the ball joint 10, steering is adversely affected due to the movement of the ball 70 within the socket 76. This cannot be prevented by the usual housing which encloses the ball 70 within the socket 76. Consequently, the instant invention comprises members of a kit to replace the usual cover for enclosing the ball 70, and this kit is so constructed that it not only encloses the ball 70 but produces a force on the ball in the same direction in which thrust is applied between the ball and the socket of the ball joint by vehicle load on the suspension system. The kit includes a bracket such as 80 provided with extending ears which are apertured at 81 and 82 to receive bolts which will clamp the socket 76 and bracket 80 securely against the bottom of the link 5. Within the bracket 80 is a chamber 83 for lubricant which is supplied by grease fitting 85 screwed into a tapped hole 86 in the bracket. The bracket has a centrally located threaded aperture 88 and an adjustable means in the form of a threaded stud 90 which screws into the threaded aperture 88. The inner end of the adjustable means, stud 90, has a socket 92 forming a cup-shaped holder for the bearing 93. Preferably, the bearing 93 is of nylon and has a concave bearing face 95 forming a socket of the universal type. A jam nut 96 threads on the stud 90 for locking the stud in an adjusted position.

Operation

The kit above described operates on the same principle when installed on the ball joint 10 shown in FIGURE 4 as the previously described kit. By operation of the adjustable means 90, the bearing member 95 is arranged to act on the ball 70 of the ball joint 10 in a direction in which thrust is applied between the elements of the ball joint by vehicle load. This action of the bearing 95 retains the ball 70 within the socket element 76 under all conditions of operation.

In this form of the invention the bracket member has a means such as bolts which pass through holes 81 and 82 to anchor the bracket on the link member 5 of the suspension system. The ball in this particular modification is a part of and moves with the steering knuckle 6 and can, therefore, be termed part of the other link in the primary load-carrying linkage. The bearing 95 applies a force between members 5 and 6 by contact with the ball 70 so as to retain the ball seated. In this respect, it operates in the same way as the modification above described.

Second Modified Form

FIGURES 6, 7 and 8 show a second modified form of the invention. This modified form again operates on the same principle as the previous forms but differs slightly in structure to accommodate the kit to a slightly different environment due primarily to the difference in design of the parts of the suspension system. The same reference characters will be used to indicate like parts of the main load-carrying members of the primary load-carrying linkage so that the similarity in operation will become apparent.

In FIGURE 6 is shown a fragmentary view of the primary load-carrying linkage, it being understood that the remainder of the linkage of the suspension system is the same except for minor detail to that shown in FIGURE 1. According to FIGURE 6, the primary load-carrying linkage is indicated as lower A-frame 5, steering knuckle 6, and ball joint 10. The A-frame 5 is formed of a pair of angularly related channels, one of which is indicated as 100. These are secured together at their free end by a gusset plate 102 and on the top riveted to the flanges of the channel members, all in a well-known manner. Riveted to the lower flanges of the channel-shaped members is a gusset plate 103 which in turn is formed to accommodate a spring seat not shown but in a manner such as illustrated in FIGURE 1. Riveted between the plates 102 and 103 is a bracket member 104 formed integral with the casing of the ball joint 10. Within the ball joint is a ball 109 having a stem 113 projecting through an aperture 110 in the casing of the ball joint 10. Ball 109 seats in a socket 105 and is sealed within the casing of the ball joint 10 by a cover such as 107.

Steering knuckle 6 carries a wheel spindle 38 and laterally projecting brackets 22 and 24 which are apertured to receive bolts for attaching the backing plate carrying the brake elements. Integrally formed as a part of the steering knuckle 6 is a horizontally projecting bracket 112 apertured to receive the stem 113 secured therein by a nut 114.

So far, the standard construction has been described and to this standard construction the following kit elements are added so as to maintain the ball 109 within its socket 105 under all conditions of operation. This kit is adapted to force the ball 109 into its seat 105 by a force which acts between the links of the primary load-carrying linkage in a direction in which thrust is applied between the elements of the ball joint by vehicle load. This kit contains two similar bracket members which are interconnected to form more or less a single bracket, the parts of which are adjustable. Plate 116 forms one part of the bracket and plate 117 forms the other part. Nut 114 on stem 113 secures bracket part 116 against any movement with respect to the steering knuckle 6 which is one link element of the suspension system. The plate element 117, however, is movable on the stem 113 in a vertical direction along the stem 113. Both plates have apertured ends to receive a pair of studs such as 119 carrying a plurality of nuts such as 120 and 121 on one end and 122 and 123 on the other end and jam nuts 96. By adjusting these nuts the distance between the parts of the bracket 116 and 117 may be varied for a purpose which will later appear. Bracket part 117 in turn carries a bearing 124 which has a lower convex face. This bearing has a socket in its lower face forming a cup-shaped holder for a plastic plug 125. In this respect, it is the same as the bearings above described with respect to FIGURE 1 and with respect to FIGURE 4, for example. The plastic plug, in turn, is arranged to have a contact with a bearing face 128 on the outer surface of the socket 105. If desired, a small insert of bearing material may be interposed between the plastic plug and the outer surface of the socket. This can be in the form of a brass ring having detents 129 which hook into the aperture 110 so as to retain the ring in place.

Operation

The operation of this form is the same as that described in FIGURE 1. With the kit installed as illustrated in FIGURE 6, the nuts 120 and 121, 122 and 123 may be adjusted to predetermine spacing between the bracket parts. The spacing of the bracket parts 116 and 117 in turn determines the position of the cup-shaped bearing 124 and these nuts may be adjusted so as to produce a force between the link 6 of the primary load-carrying linkage and the upper surface of the cup 105 which is on the other link 5 of the primary load-carrying system. This in turn, will cause the ball 109 to remain seated in the cup 105. Suitable provision may be made for lubrication by the provision of a grease fitting 130 and a passage 131 and the bearing surface may be surrounded with a rubber boot such as 133 to prevent dust and mud from entering between the bearing faces 125 and 128, etc.

FIGURE 8 shows the parts of the kit dis-assembled from the structure so as to facilitate a clear understanding of the fact that the kit can be separately packaged and merchandised for application to the particular suspension system of the particular make of motor car. Installation is relatively a simple matter as compared with replacement of the ball joint itself, and the kit parts are much cheaper in first costs and as well as in labor installation cost.

Fourth Modified Form

FIGURE 9 is a fragmentary view of another form of suspension system which differs from that shown in FIGURE 6 only in the manner in which the ball joint is mounted in the primary link 5 of the suspension system. In this modification, the ball and socket joint 10 is provided with threads 145, on its exterior surface which in turn, screw into a socket 148 in the primary link 5. In other respects, the linkage is exactly the same in general layout and, what's more, is adapted to take the same kit as shown in FIGURES 6 and 7. A kit is applied in the same way and produces exactly the same results. For this reason, a further detailed description is not deemed necessary.

Certain structures have been described herein which will fulfill all of the objects of the invention, but it is contemplated that other modifications will occur to those skilled in the art which come within the scope of the appended claims.

Having thus described the invention, what is claimed and desired to be secured by Letters Patent is:

1. A kit for adjusting the clearance between the load-carrying portion of a ball element and its socket element in a ball joint of a vehicle suspension system, in which the ball joint forms the universal connection between two link members in a primary load-carrying linkage, said kit comprising a bracket member, a means on said bracket member for mounting said bracket member rigidly attached to one of the link members of the suspension system on a portion adjacent to and fixed with respect to the ball element of said ball joint, a universal type of socket bearing member adapted to act directly on the socket element of said ball joint to produce a thrust in a direction in which the thrust is applied between the elements of said ball joint by vehicle load on the suspension system, and an adjustment means between said bracket and said bearing member for determining the initial loading therebetween.

2. A kit for adjusting the clearance between the load-carrying portion of a ball element and its socket element in a ball joint of a vehicle suspension system, in which the ball joint forms the universal connection between two link members in a primary load-carrying linkage, said kit comprising a bracket member, a means for mounting said bracket member rigidly attached to one of the link members of the suspension system and on a portion thereof adjacent to and fixed with respect to the ball element of said ball joint, a universal type of socket bearing mechanism adapted to act directly on the socket element of said ball joint to produce a thrust in a direction in which thrust is applied between the elements of said ball joint by vehicle load on the suspension system, the socket element of said ball joint being fixed with respect to the other of the link members of the suspension system, and an adjustable means between said bracket and said bearing mechanism constructed and arranged to apply a force on the socket element and between the link members of said suspension system to retain the ball element in the socket element of said ball joint.

3. A kit for adjusting the clearance between the load-carrying portion of a ball element and its socket element in a ball joint of a vehicle suspension system, in which the ball joint forms the universal connection between two link members in a primary load carrying linkage, said kit comprising a bracket member with a threaded aperture, a means for mounting said bracket member on one of the link members of the suspension system and on a portion adjacent to and fixed with respect to the ball element of said ball joint, a bearing mechanism adapted to act on the other of said members mounting said socket element of said ball joint to produce a thrust between the ball joint elements in the same direction as applied by vehicle load on the suspension system, the socket element of said ball joint being fixed with respect to the other of the link members of said suspension system, said bearing mechanism including hollow co-operating bearing members having cup-like convex and concave engaging faces, one of said bearing members having the concave face being provided with a passage axially thereof, and an adustable means threaded in the threaded aperture of said bracket and mounting said bearing member with the concave face in a manner constructed and arranged to apply a force between the members of the bearing mechanism in a direction to force the link members of said suspension system to retain said ball element in said socket element, and an axial passage in said adjustable means registering with the axial passage in the concave bearing member.

4. A kit for adjusting the clearance between the load-carrying portion of a ball element and its socket element in a ball joint of a vehicle suspension system, in which the ball joint forms the universal connection between two link members in a primary load-carrying linkage, said kit comprising a bracket member with a centrally located threaded aperture, a means for mounting said bracket member on one of the link members of said suspension system and on a portion adjacent to and fixed with respect to the ball element of said ball joint, a bearing mechanism adapted to act on the other of said link members mounting the socket element of said ball joint in a direction in which thrust is applied between the elements of said ball joint by vehicle load on the suspension system, the socket element of said ball joint being mounted fixed with respect to the other of the link members of the suspension system, said bearing mechanism including hollow co-operating bearing members having cup-like convex and concave engaging faces, and an adjustable means including a threaded stud co-operating with the threads in the aperture of said bracket member, said threaded stud having a socket in one end thereof forming a holder, one of said bearing members having the concave face being a plastic plug of bearing material retained in said socket, said adjustable means being so constructed and arranged as to apply a force through said bearing mechanism acting between the link members of said suspension system to retain the ball element in the socket element.

5. A kit for adjusting the clearance between the load-carrying portion of a ball element and its socket element in a ball joint of a vehicle suspension system, in which the ball joint forms the universal connection between two link members in a primary load-carrying linkage, said kit comprising a pair of parallelly disposed brackets, means for mounting one of said brackets on one of the link members of said suspension system on a portion adjacent to and fixed with respect to the ball element of said ball joint, a bearing mechanism adapted to act on the socket element of said ball joint in a direction in which thrust is applied between the elements of said ball joint by vehicle load on the suspension system, the socket element of said ball joint being fixed with respect to the other of the link members of the suspension system, said bearing mechanism including hollow co-operating bearing members having cup-like convex and concave engaging faces, means for mounting said concave member on the other of said brackets and an adjustable means between said bracket members constructed and arranged to apply a force in a direction to apply an initial stress between the link members of said suspension system to retain the ball element in the socket element of said ball joint.

6. A kit for adjusting the clearance between the load carrying portion of a ball element and its socket element in a ball joint of a vehicle suspension system, in which the ball joint forms the universal connection between two link members in a primary load-carrying linkage, said kit comprising a pair of bracket members, a means for mounting one of said bracket members on one of the link members of the suspension system on a portion adjacent to and fixed with respect to the ball element of said ball joint, a bearing mechanism including a cup-shaped holder and a plug of plastic bearing material mounted in said holder, said bearing mechanism being mounted on the other of said bracket members and adapted to act on the socket element of said ball joint in a direction in which thrust is applied between the elements of said ball joint by vehicle load on the suspension system, the socket element of said ball joint being fixed with respect to the other of the link members of the suspension system, and an adjustable means between said bracket members constructed and arranged to apply a force through the bearing mechanism acting between the link members of said suspension system to retain the ball element in the socket element.

7. A kit for adjusting the clearance between the load-carrying portion of a ball element and its socket element in a ball joint of a vehicle suspension system in which the ball joint forms the universal pivoting connection between two link members in a primary load-carrying linkage, one of said link members being a steering knuckle, said kit comprising replaceable items including an angularly shaped bracket member, means for securing said angularly shaped bracket member to the said steering knuckle adjacent the socket element of said ball joint and fixed with respect to the ball element of said ball joint, a bearing member including a cup-shaped holder and a plug of plastic bearing material mounted in said holder and adapted to act on the link member carrying the socket element of said ball joint to produce a thrust in a direction in which thrust is applied between the elements of said ball joint by vehicle load on the suspension system, the socket element being fixed with respect to the other of the link members of the suspension system, a cup-shaped element with a convex bearing surface seated on the other of said link members, a threaded aperture in said bracket member, a threaded stud in the threaded aperture having a socket in one end thereof forming said cup-shaped holder for the plastic plug of bearing material, said adjustable means including said threaded stud and threaded aperture being so constructed and arranged as to position said plastic plug with respect to said cup-shaped element for pressing said cup-shaped element against said other link member and thereby applying a force between the link members of said suspension system to retain the ball element in the socket element of said ball joint.

8. A kit for adjusting a clearance between the load-carrying portion of a ball element and its socket element in a ball joint of a vehicle suspension system in which the ball joint forms the universal pivotal connection between two link members in a primary load-carrying linkage in which one of said link members is a steering knuckle, said kit comprising a bracket member, a means on said bracket member adapting the bracket member for connection between the steering knuckle and the ball joint suspension system on the portion of the steering knuckle fixed with respect to the ball element of said ball joint, a bearing mechanism mounted on the link carrying said ball element and adapted to act directly on the link member carrying the socket element of said ball joint in a direction in which thrust is applied between the elements of said ball joint by vehicle load on the suspension system, said bearing mechanism including a socket bearing member, an adjustment means between said bracket and said socket bearing member, a cup-shaped bearing enclosing the socket element of said ball joint in contact with the other of said link members, a convex bearing face on said cup-shaped member for co-operation with the said socket bearing member, said adjustment means between said bracket and said first bearing member determining the initial loading between said bearing members.

9. A kit for adjusting the clearance between the load-carrying portion at the upper part of a ball element and the under side of its superposed socket element in a ball joint of the universal type for a vehicle suspension system, in which the ball joint forms the universal connection between two link members in a primary load-carrying linkage, said kit comprising a bracket, a means on said bracket member for mounting said bracket member rigidly attached to one of the link members of the suspension system on a portion adjacent to, and fixed with respect to, and carrying the ball element of said ball joint, a universal type of socket bearing mechanism adapted to act on the other one of the members carrying the socket element of the ball joint to produce a thrust between the parts thereof in a direction in which thrust is applied between the elements of the ball joint by vehicle load on the suspension system, and an adjustment means between said bracket member and said bearing mechanism for determining the initial loading therebetween.

10. A kit for adjusting the clearance between the load-carrying portion at the upper part of a ball element and the under side of its superposed socket element in a ball joint of the universal type for a vehicle suspension system, in which the ball joint forms the universal connection between two link members in a primary load-carrying linkage one of which is a steering knuckle, said kit comprising a bracket member, a means for mounting said bracket member rigidly attached to one of the link members which is the steering knuckle of the suspension system on a portion adjacent to, and fixed with respect to, one element of the ball joint, a universal type of socket bearing mechanism adapted to act on the link member carrying the other element of the ball joint to produce a thrust in a direction in which thrust is applied between the elements of the ball joint by vehicle load on the suspension system, the ball joint element on which said bearing mechanism is adapted to act being fixed with respect to the other of the link members of the suspension system, and an adjustable means between said bracket and said bearing mechanism constructed and arranged to apply a force between the link members of said suspension system to retain the ball element in its socket element.

11. A kit for adjusting the clearance between the load-carrying portion at the top of a ball element opposite a projecting stem thereon and the load carrying under side of its superposed socket element in a ball joint of the universal type for a vehicle suspension system, in which the ball joint forms the universal connection between two link members in a primary load-carrying linkage, said kit comprising a bracket member, a means for mounting said bracket member on one of the link members of a suspension system on a portion adjacent to, and fixed with respect to, the ball element of the ball joint, a universal type of socket bearing member including a cup-shaped holder and a plug of plastic bearing material mounted in said holder adapted to act on the other of the elements of said ball joint to produce a thrust in a direction in which thrust is applied between the elements of the ball joint by vehicle load on the suspension system, the other ball joint element being fixed with respect to the other of the link members of the suspension system, and an adjustable means between said bracket member and said bearing member constructed and arranged to apply a force between the linkage members of said suspension system to retain the ball element in the socket element.

References Cited in the file of this patent

UNITED STATES PATENTS

| | | |
|---|---|---|
| 1,116,571 | Danver | Nov. 10, 1914 |
| 2,444,658 | Lucas | July 6, 1948 |
| 2,620,202 | Coleman | Dec. 2, 1952 |
| 2,822,185 | Mineck | Feb. 4, 1958 |
| 2,853,326 | Booth | Sept. 23, 1958 |
| 2,911,244 | Mineck | Nov. 3, 1959 |
| 2,937,895 | Langen et al. | May 24, 1960 |
| 2,954,993 | Scheublein et al. | Oct. 4, 1960 |

FOREIGN PATENTS

| | | |
|---|---|---|
| 1,048,050 | France | July 29, 1953 |